US008424213B2

(12) United States Patent
Fukinuki

(10) Patent No.: US 8,424,213 B2

(45) Date of Patent: Apr. 23, 2013

(54) CIRCULAR SAW HAVING A DIRECT CURRENT POWER SUPPLY

(75) Inventor: Masatoshi Fukinuki, Nanjing (CN)

(73) Assignee: Chervon Limited, Wanchai (HK)

( * ) Notice: Subject to any disclaimer, the term of this patent is extended or adjusted under 35 U.S.C. 154(b) by 208 days.

(21) Appl. No.: 12/786,670

(22) Filed: May 25, 2010

(65) Prior Publication Data

US 2010/0299943 A1 Dec. 2, 2010

(30) Foreign Application Priority Data

Jun. 1, 2009 (CN) ...................... 2009 2 0046200 U

(51) Int. Cl.
*B23D 45/16* (2006.01)

(52) U.S. Cl.
USPC ............................................... 30/388; 30/374

(58) Field of Classification Search ............ 30/388–391; D8/66
See application file for complete search history.

(56) References Cited

U.S. PATENT DOCUMENTS

| | | | | |
|---|---|---|---|---|
| 1,531,930 | A * | 3/1925 | Harrison | 30/373 |
| 4,555,849 | A * | 12/1985 | Ando et al. | 30/388 |
| 4,589,208 | A * | 5/1986 | Iwasaki et al. | 30/376 |
| D335,433 | S * | 5/1993 | Schultz et al. | D8/66 |
| D363,656 | S * | 10/1995 | Gierke | D8/66 |
| 5,850,698 | A | 12/1998 | Hurn et al. | |
| 5,856,715 | A | 1/1999 | Peot et al. | |
| D411,425 | S * | 6/1999 | Sugimoto et al. | D8/66 |
| 6,470,576 | B2 * | 10/2002 | Watson | 30/377 |
| 6,775,913 | B2 * | 8/2004 | Fey et al. | 30/388 |
| 6,889,439 | B2 * | 5/2005 | Koukal et al. | 30/377 |
| 6,898,854 | B2 * | 5/2005 | Zemlok et al. | 30/122 |
| 7,219,434 | B2 * | 5/2007 | Moore et al. | 30/391 |
| 2006/0107536 | A1 * | 5/2006 | Buck et al. | 30/388 |
| 2008/0127795 | A1 * | 6/2008 | Fukinuki | 83/471.3 |
| 2009/0071017 | A1 * | 3/2009 | Gehret | 30/391 |
| 2011/0185581 | A1 * | 8/2011 | Xing et al. | 30/374 |
| 2011/0239472 | A1 * | 10/2011 | Parks | 30/391 |

* cited by examiner

*Primary Examiner* — Hwei C Payer

(74) *Attorney, Agent, or Firm* — McDermott Will & Emery LLP

(57) ABSTRACT

A circular saw has a housing, a direct current motor, a battery assembly, a handle having first and second ends, a circular saw blade and a base plate. The motor is located outside of an area defined by the radius of the circular blade and between the first and second ends of the handle and the blade is laterally aligned with the handle. The circular saw also has a center of gravity which lies close to the plane defined by the saw blade, is below the handle and is within the length of the base plate. As a result of this arrangement, the circular saw of the present invention reduces the influence of the torque created during a cutting operation and improves the balance and operation of the circular saw.

10 Claims, 2 Drawing Sheets

CIRCULAR SAW HAVING A DIRECT CURRENT POWER SUPPLY

CROSS-REFERENCE TO RELATED APPLICATIONS

This application claims priority under 35 U.S.C. §119 to CN 200920046200.5 filed Jun. 1, 2009, which is hereby incorporated by reference.

FEDERALLY SPONSORED RESEARCH OR DEVELOPMENT

Not Applicable.

TECHNICAL FIELD

The invention relates to a direct current circular saw having a battery assembly as a power supply. Specifically, the invention is directed to a circular saw with a direct current power supply that has improved balance and operability

BACKGROUND OF THE INVENTION

Traditionally, a portable circular saw has a housing, a motor in the housing, a handle mounted on the housing, a rotatable circular saw blade connected with the motor, a fixed blade guard mounted on the housing and covering the upper part of the blade, a base plate for supporting the housing, a movable blade guard pivotally mounted to the housing and covering the lower part of the blade which extends out of the base plate, and a battery assembly connected to the housing for supplying power to the motor.

In the prior art, the motor and the handle are typically arranged on one side of a plane formed by the circular saw blade. Therefore, when a user holds the handle of the circular saw, the force applied to the handle by the user is not in the same plane as the circular saw blade and can cause a torque relative to the circular saw blade. As a result, during a cutting operation, the torque urges the circular saw blade to stray off line in the direction of the torque. This can cause the cutting line of the circular saw blade to deviate from the initial plane of the circular saw blade. To accommodate for the torque, the user must continually adjust the direction of the force applied to the handle to offset the torque and to ensure the cutting accuracy of the saw blade. This additional effort by the user increases the effort required and the overall difficulty of the cutting operation. In sum, when the motor of a circular saw is arranged on one side of the saw blade and is in a different plane than the saw blade, the effort required by the user and the difficulty of operation is unnecessarily increased because of the design and balance of the circular saw assembly.

SUMMARY OF THE INVENTION

It is thus an object of the present invention to provide a circular saw with a direct current power supply that has improved balance and operability.

To achieve improved balance and operability, the circular saw according to the present invention has a housing, a direct current motor located in the housing and a first rotating axis. The saw also includes a battery assembly adapted to supply power to the direct current motor, a handle including a first end connected with the housing and a second end connected with the battery assembly, a circular saw blade driven to rotate by the direct current motor and a second rotating axis parallel to the first rotating axis, and a base plate supporting the housing. Wherein the second end of the handle is higher than the first end, the direct current motor is located outside of a scope defined by the radius of the circular saw blade and between the first end and the second end of the handle. Further, the circular saw blade is aligned with the handle, the circular saw has a center of gravity which is close to the same plane as the circular saw blade, below the handle and within the length of the base plate, and the first rotating axis and the second rotating axis define a plane which forms an angle with the base plate therebetween.

As a result of the handle being aligned with the blade and the center of gravity of the circular saw being located close to the plane of the blade, the circular saw of the present invention thereby eliminates the influence of the torque produced during the cutting process to improve the balance of the circular saw and decrease the effort required by and difficulty associated with the operation of the circular saw by a user.

BRIEF DESCRIPTION OF THE DRAWINGS

This invention will be further explained in details with combination of accompanying drawings and embodiments.

DETAILED DESCRIPTION

Figure 1:
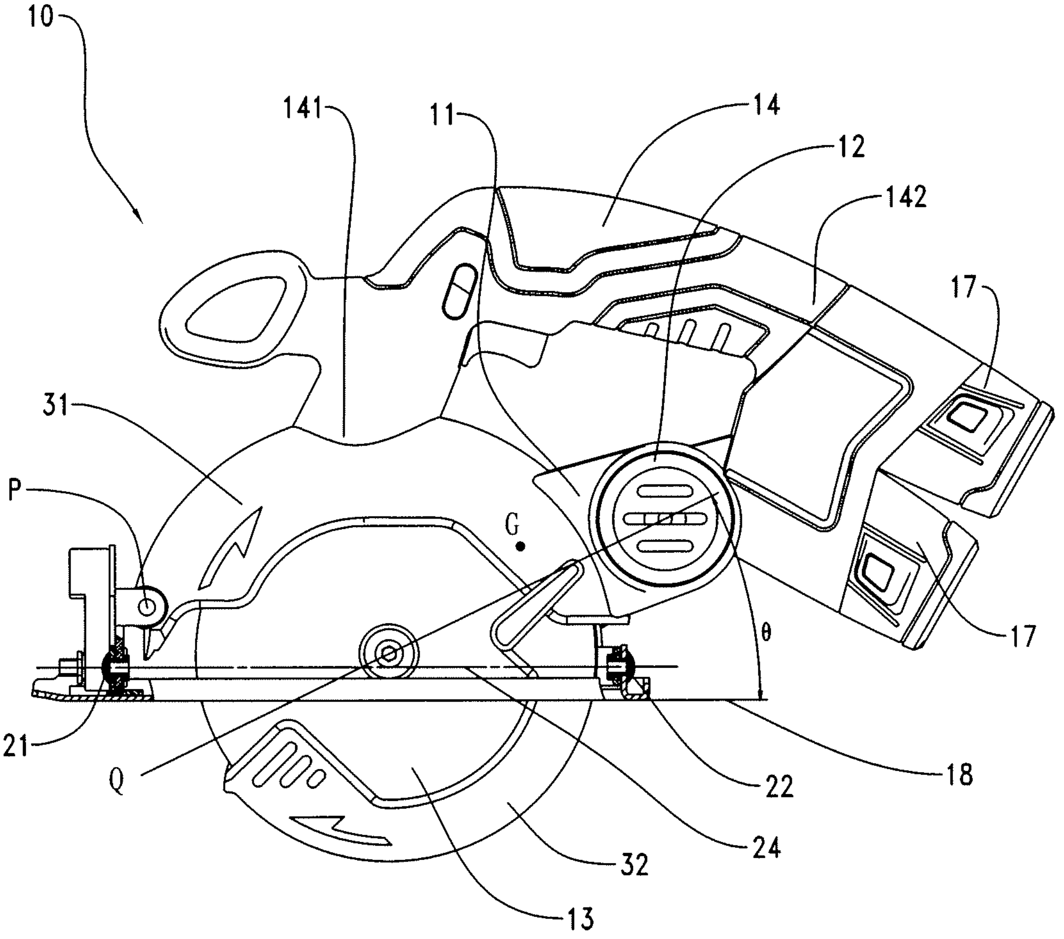
FIG. 1 is a front view of a direct current circular saw of a preferred embodiment according to the present invention.
Figure 2:
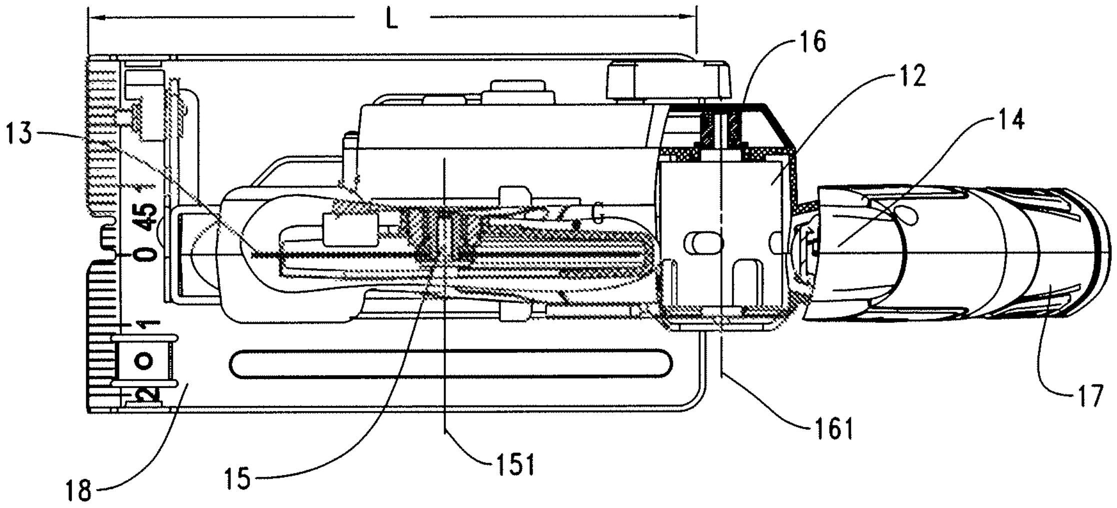
FIG. 2 is a top view of the circular saw shown in FIG. 1 with parts of which are cut off; and, FIG. 3
Figure 3:
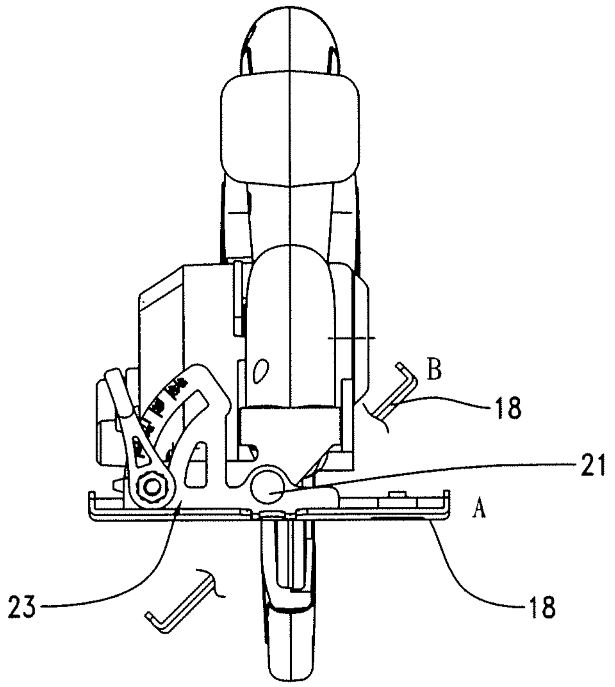
FIG. 3 is a left side view of the circular saw shown in FIG. 1.

FIG. 1 illustrates a direct current circular saw 10 according to a preferred embodiment of the present invention. Referring to FIGS. 1-3, the direct current circular saw 10 comprises a housing 11, a direct current motor 12 mounted in the housing 11, a circular saw blade 13 driven to rotate by the direct current motor 12, and a handle 14 mounted or formed on the housing 11. The circular saw blade 13 is supported by a blade spindle 15 and is rotatable about an axis 151 of the blade spindle 15. The direct current motor 12 includes a motor shaft 16, and is rotatable about a rotating axis 161 of the motor shaft 16. The rotating axis 161 is parallel to the axis 151 of the blade spindle 15. A transmission device (not shown) is connected between the motor shaft 16 and the blade spindle 15 so that the rotating movement of the direct current motor 12 can be transferred to the circular saw blade 13. In the prior art, the transmission device includes gear transmission mechanisms, belt transmission mechanisms, and the combination of the above. Such transmission mechanisms are well known to one of ordinary skill in the art and are not described in detail herein. Usually, the direct current circular saw 10 also includes a battery assembly 17 for supplying power to the direct current motor 12. If it is desired, the direct current circular saw 10 can be equipped with a battery assembly 17 that has a single battery, two batteries, or multiple batteries. In the present embodiment, two batteries are utilized to supply power to the motor 12. Additionally, the connection between the battery assembly 17 and the housing 11 can be of an insert type or a sliding type. The connecting manner of insert type usually is constructed with a projection on the battery assembly and an orifice, which is mateable with the projection on the housing, so the battery assembly can be removeably mounted to the housing by inserting the projection into the orifice of the housing. The sliding type connecting manner is commonly constructed with rails formed on one of the battery assembly and the housing and grooves, which can receive the rails, formed on the other of the battery assembly and the housing, so that the battery assembly can be removeably connected to the housing by the cooperation of the rails and grooves. The connecting manners for the battery assembly and the housing are well known to one of ordinary skill in the art and will not be further explained herein.

The direct current circular saw 10 further comprises a base plate 18 which supports the housing 11 thereon and has a length L. Preferably, the base plate 18 supports the housing 11 in such a manner that the housing 11 could be inclined with respect to the base plate 18 using two rotatable pins 21 and 22 and an angle adjusting and locking mechanism 23. Accordingly, the base plate 18 may be inclined about a longitudinal axis 24 which passes through centers of the rotatable pins 21 and 22. The cutting angle of the circular saw blade 13 changes from a position A as shown in FIG. 3, where the circular saw blade 13 is perpendicular to the base plate 18, to a position B where the blade is inclined in relation to the base plate 18. The angle adjusting and locking mechanism 23 is adapted to lock the base plate 18 in position at a certain inclined angle. FIG. 3 is merely an illustration of when the circular saw blade 13 is inclined to one side of the position A of the blade relative to the base plate 18. It easily follows, that in other embodiments known to one of ordinary skill in the art the circular saw blade could be inclined to either of two sides of the position A. Additionally, the base plate 18 supports the housing 11 in a well known manner to allow the housing 11 to pivot about a pivotal point P to adjust the cutting depth of the blade 13.

Generally, the housing 11 of the direct current circular saw 10 is mounted or formed with a fixed upper blade guard 31 for covering the upper portion of the blade 13 and a movable lower blade guard 32 for covering the lower portion of the blade. In the present invention, the fixed upper blade guard 31 is directly formed on the housing 11 as a part of the housing 11. In other embodiments, it may be easily understood to fixedly mount a separate upper blade guard on the housing.

In the present embodiment, the handle 14 is aligned laterally with the blade 13 and includes a first end 141 connected to the fixed upper blade guard 31 and a second end 142 connected to the battery assembly 17, wherein the second end 142 is higher than the first end 141. The direct current motor 12 is located between the first end 141 and the second end 142. In the present embodiment, the direct current motor 12 is also arranged behind the blade 13 and outside of the area defined by the radius of the blade 13. By arranging the motor 12 outside of the area defined by the radius of the blade 13, the direct current motor 12 is able to sit in the same plane as the blade 13. with parts of the motor 12 being distributed on the both sides of the blade 13, in other words, the direct current motor 12 transverses the plane where the blade 13 lies, The position of the motor 12 may be adjusted laterally with respect to the plane of the blade 13 to enable a user to position the center of gravity of the motor 12 as close as possible to the plane of the circular blade 13. By aligning the handle 14 with the circular blade and distributing the motor 12 on both sides of the blade 13, the balance of the direct current circular saw 10 and the operability during a cutting operation are both significantly improved. Additionally, compared to the prior art where the motor is disposed on one side of the plane of the blade, the present invention decreases the width of the circular saw 10 by arranging the motor 12 on both sides of the blade 13 to make the lateral size of the circular saw 10 smaller which achieves a better weight distribution and improves the balance of the circular saw 10.

In the present embodiment, the axis 151 of the blade spindle 15 and the rotating axis 161 of the driving shaft 16 define a plane Q which forms an angle θ relative to the base plate 18 therebetween. When the circular saw 10 is in the position of the maximum depth of cutting (i.e. the position shown in FIG. 1), the value of the angle θ is no more than 45°, and is preferably set at 45°. Meanwhile, in the position of the maximum depth of cutting, at least a portion of the motor 12 extends past the length L of the base plate 18. In the present embodiment, the center of gravity of the motor 12 is lower and closer to the base plate 18 when the angle θ is between 0° and 45°. The deviation of the center of gravity from the cutting line of the blade 13 decreases when the circular saw 10 is in an inclined position relative to the base plate 18, which improves the balance of the circular saw 10 during an inclined cutting operation.

The direct current circular saw has a center of gravity G. After positioning the handle 14, the circular saw blade 13 and the direct current motor 12 of the circular saw 10 as described above, the center of gravity G is closer to the plane of the blade 13, is below the handle 14, and is within the length L of the base plate 18. Because the center of gravity G is closer to the plane of the blade 13, the direct current circular saw 10 in the present invention provides better balance and the blade 13 is less likely to deviate from a predetermined cutting line during operation.

The above described embodiments are only explanatory to the concept and principle of this invention and are not meant to limit to the content of the invention. Those of ordinary skill in the art will contemplate that this invention will have obvious modifications or substitutions which are still within the scope of the above described invention.

What is claimed is:

1. A direct current circular saw, comprising:

a housing;

a direct current motor within the housing having a first rotating axis;

a battery assembly to supply power to the direct current motor:

a handle having a first end and a second end, wherein the first end is coupled to the housing and the second end is coupled to the battery assembly;

a circular saw blade having a second rotating axis parallel to the first rotating axis driven rotate by the motor;

a base plate supporting the housing having a length;

wherein the second end of the handle is higher than the first end of the handle, and the direct current motor has the first rotating axis outside of the area fined by the length of the base plate and is located outside of an area defined by the radius of the circular saw blade;

the circular saw blade being aligned with the handle; and a center of gravity over the base plate below the handle and close to a first plane formed by a side surface of the circular saw blade.

2. The circular saw of claim 1, wherein the direct current motor is located between the first end and the second end of the handle.

3. The circular saw of claim 1, wherein the first rotating axis and the second rotating axis define a second plane, with an inclined angle being formed between the base plate and the second plane, the inclined angle being no more than 45° when the direct current saw is in a position to allow for maximum depth of cutting.

4. The circular saw of claim 3, further comprising a cutting angle adjusting mechanism for adjusting the inclined angle of the circular saw blade with respect to the base plate.

5. The circular saw of claim 1, wherein at least a portion of the direct current motor exceeds the length of the base plate when the direct current circular saw is in a position to allow for maximum depth of cutting.

6. The circular saw of claim 1, wherein a driving shaft is arranged along the first rotating axis and a blade spindle for supporting the circular saw blade is arranged along the second rotating axis and a transmission means is connected between the driving shaft and the blade spindle.

7. The circular saw of claim 1, wherein a blade spindle for supporting the circular saw blade is arranged along the second rotating axis and a transmission means is connected between the driving shaft and the blade spindle.

8. The circular saw of claim 1, wherein the battery assembly is removably mounted on the handle.

9. A direct current circular saw, comprising:

a housing;

a direct current motor within the housing having a first rotating axis;

a battery assembly to supply power to the direct current motor;

a handle having a first end and a second end, the first end being coupled to the housing and the second end being coupled to the battery assembly and the direct current motor being located between the first end and the second end of the handle;

circular saw blade having a seeond rotating axis parallel to the first rotating axis driven to rotate the motor;

a base plate supporting the housing having a length;

wherein the second end of the handle is higher than the first end of the handle, and the direct current motor is located outside of an area defined by the radius of the circular saw blade and has a central axis outside of the area defined by the length of the base plate;

the circular saw blade being aligned with the handle;

the direct current circular saw has a center of gravity substantially in alignment with a first plane formed by the circular saw blade and the center of gravity is below the handle and is located over the base plate;

the first rotating axis and the second rotating axis defining a second plane, with an inclined angle being formed between the base plate and the second plane, the inclined angle is no more than 45° when the direct current circular saw is in a position to allow for maximum depth of cutting and at least a portion of the direct current motor exceeds the length of the base plate when the direct current circular saw is in a position to allow for maximum depth of cutting;

a cutting angle adjusting mechanism for adjusting the inclined angle of the circular saw blade with respect to the base plate;

a driving shaft being arranged along the first rotating axis;

a blade spindle for supporting the circular saw blade and is arranged along the second rotating axis and a transmission means is connected between the driving shaft and the blade spindle; and, the battery assembly is removably mounted on the handle.

10. The circular saw of claim 9, wherein the inclined angle is 45° when the direct current saw is in a position to allow for maximum depth of cutting.

* * * * *